United States Patent [19] [11] 4,049,576
Kovach et al. [45] Sept. 20, 1977

[54] PLATINUM-PALLADIUM CATALYST FOR SELECTIVE HYDROGENATION OF AROMATICS AND OLEFINS IN HYDROCARBON FRACTIONS

[75] Inventors: Stephen M. Kovach; George D. Wilson, both of Ashland, Ky.

[73] Assignee: Ashland Oil, Inc., Ashland, Ky.

[21] Appl. No.: 628,066

[22] Filed: Nov. 3, 1975

Related U.S. Application Data

[62] Division of Ser. No. 511,985, Oct. 4, 1974, Pat. No. 3,943,053.

[51] Int. Cl.$^2$ .................. B01J 27/06; B01J 23/56
[52] U.S. Cl. .................... 252/441; 252/442; 252/466 PT; 252/472
[58] Field of Search ............ 252/466 PT, 441, 442, 252/472

[56] References Cited

U.S. PATENT DOCUMENTS

| 2,911,357 | 11/1959 | Myers et al. | 208/143 |
| 3,030,186 | 4/1962 | Kreuz et al. | 252/466 PT |
| 3,173,857 | 3/1965 | Haenset | 252/466 PT |
| 3,271,327 | 9/1966 | McEvoy et al. | 252/466 PT |
| 3,280,041 | 10/1966 | Michael | 252/466 PT |
| 3,437,425 | 4/1969 | Quesada | 252/466 PT |
| 3,549,720 | 12/1970 | Wright et al. | 252/466 PT |
| 3,694,348 | 9/1972 | Bursian et al. | 252/466 PT |
| 3,745,112 | 7/1973 | Rausch | 252/466 PT |
| 3,759,823 | 9/1973 | Davies et al. | 208/143 |

*Primary Examiner*—Patrick P. Garvin
*Assistant Examiner*—Mark Bell
*Attorney, Agent, or Firm*—Van D. Harrison, Jr.

[57] ABSTRACT

Hydrocarbon fractions boiling between 180° and 600° F. and containing aromatics, olefins, and sulfur and nitrogen compounds are hydrogenated with a platinum-palladium catalyst to reduce the concentration of aromatics and olefins. The catalyst is prepared by saturating a porous inert carrier, preferably alumina, with an aqueous acid solution of chloroplatinic acid and palladium (ous) chloride in a specified mole ratio of platinum to palladium. The saturated carrier is subsequently dried, calcined and reduced.

6 Claims, 1 Drawing Figure

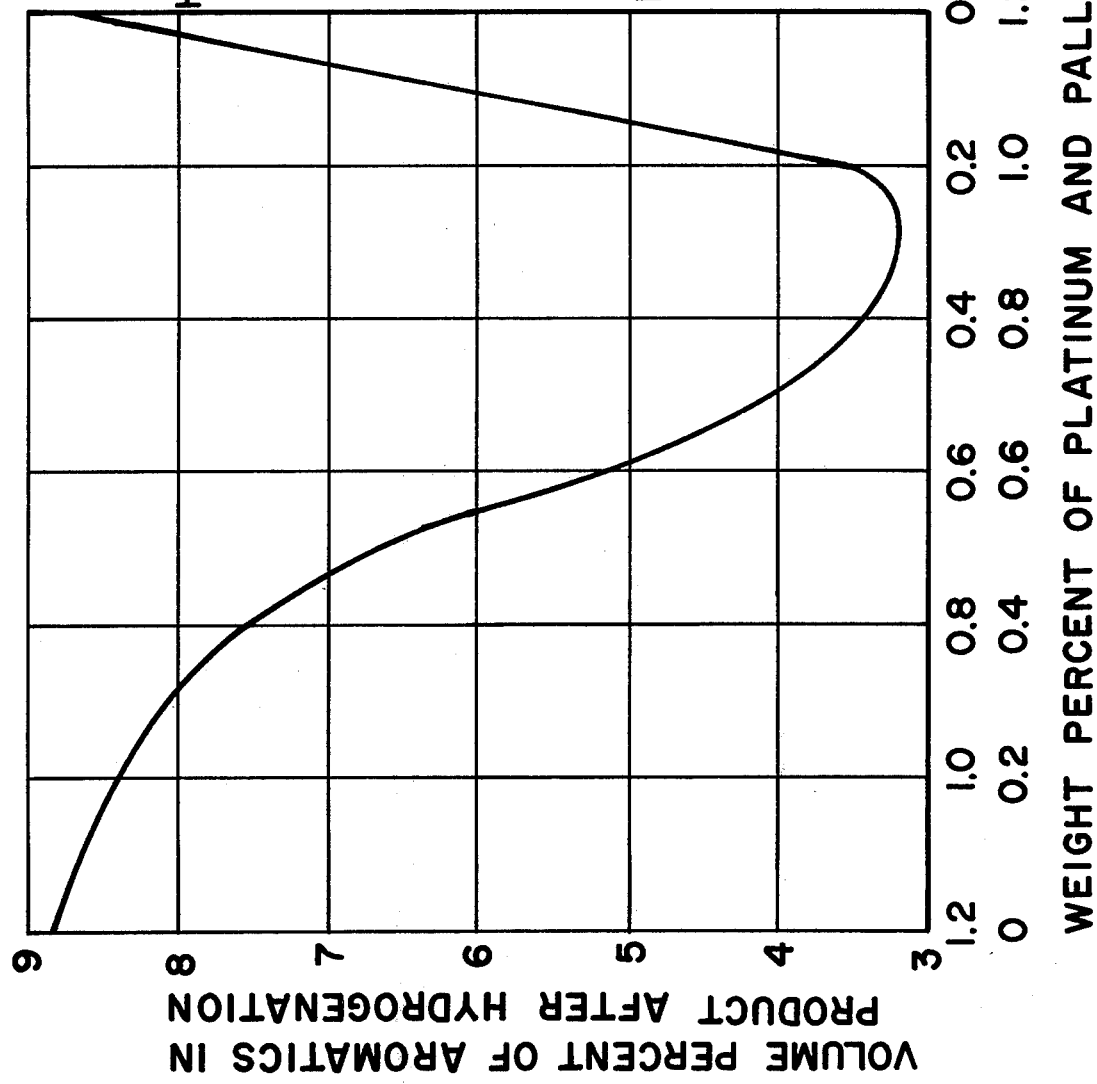

PLATINUM-PALLADIUM CATALYST FOR SELECTIVE HYDROGENATION OF AROMATICS AND OLEFINS IN HYDROCARBON FRACTIONS

This is a division of application Ser. No. 511,985, filed Oct. 4, 1974 now U.S. Pat. No. 3,943,053 issued Mar. 9, 1976.

NATURE OF INVENTION

This invention relates to methods for reducing the olefins and aromatics content of hydrocarbon liquid mixtures by catalytic hydrogenation. More specifically it relates to a precious metal catalyst and method using that catalyst to reduce by hydrogenation the olefinc and aromatic content of hydrocarbon fractions, particularly those containing sulfur and nitrogen compounds.

BACKGROUND OF THE INVENTION

The need for relatively nonaromatic liquid hydrocarbons boiling in the range of about 300° to 700° F. (aviation turbine fuels, diesel fuels, and solvents, for example) continues to increase. These products usually, or at least often, contain relatively high percentages of olefins and monocyclic and polycyclic aromatics so that further hydrogenation is desirable to produce acceptable products. The presence of sulfur compounds in these products to be hydrogenated complicates the process of hydrogenation in that sulfur poisons many of the metal catalysts used for hydrogenation.

The hydrogenation of unsaturated hydrocarbons, particularly aromatic hydrocarbons, to corresponding saturated hydrocarbons using a platinum and/or palladium catalyst is disclosed in U.S. Pat. No. 3,637,484. The platinum and/or palladium is deposited selectively by cation exchange upon a silica-alumina cogel or copolymer which in turn is dispersed in a large pore alumina gel matrix. U.S. Pat. No. 3,674,888 discloses a process for selectively hydrogenating unsaturated hydrocarbons in the liquid phase utilizing a palladium-on-alumina catalyst. The catalyst is the product resulting from contacting alumina agglomerates of a specified surface area with steam, and after additional treatment, admixing the agglomerate with a palladium compound and subsequently calcining the resulting mixture. As noted briefly before, however, a primary disadvantage of using either the platinum or palladium catalysts is the ease with which these catalysts are poisoned with sulfur and nitrogen compounds and thereby rendered ineffective.

A primary object of this invention is to provide a catalyst and process for hydrogenating petroleum fractions containing aromatics, and olefins as well as sulfur and nitrogen compounds.

SUMMARY OF THE INVENTION

Briefly stated this invention comprises in one aspect a catalyst for hydrogenating aromatics and olefins present in hydrocarbon fractions boiling between about 200° and 700° F. particularly those containing sulfur and nitrogen compounds, the catalyst consisting of both platinum and palladium concurrently deposited in preferred mole ratios on an inert carrier.

In still another aspect, this invention comprises the process of hydrogenating at least a portion of the aromatics and olefins present in hydrocarbon fractions boiling between about 200° and about 700° F. particularly those containing sulfur and nitrogen compounds, by contacting these fractions with the aforedescribed catalyst in the presence of hydrogen gas under conditions whereby at least a portion of the aromatics and olefins present are hydrogenated.

In yet still another aspect this invention comprises a process for preparing a hydrogenation catalyst comprising the steps of absorbing onto an inert carrier, preferably a gamma alumina, a solution consisting of both chloroplatinic acid and palladium (ous) chloride, as well as a mineral acid in water, and subsequently heating the inert carrier containing the absorbed solution to a temperature sufficient to vaporize the water therein and subsequently to a temperature sufficient to decompose the platinum and/or palladium compounds absorbed thereon.

BRIEF DESCRIPTION OF THE DRAWINGS

In the drawings
FIG. 1 is a graph showing effectiveness of the catalyst of this invention when the total weight percent of platinum and palladium is held constant but the mole ratio of platinum to palladium is varied.

DETAILED DESCRIPTION OF THE INVENTION

PREPARATION OF THE CATALYST

The catalyst support or carrier for the platinum-palladium catalyst of this invention can be any inert oxide support. Preferably, the support is a high-surface-area gamma alumina, such as the beta, eta, and gamma alumina forms, bayerite, and boehmite. The catalyst of this invention, in addition to serving as a hydrogenation catalyst for aromatics and olefins in solvents also has utility for hydrogenating benzene to cyclohexane. However, if an acidic support or carrier is used, for example silica-alumina benzene is converted to methyl cyclopentane in substantial quantities at the expense of converting benzene to cyclohexane. For this reason alumina is preferred over silica-alumina.

To impregnate the carrier with platinum and palladium an aqueous solution consisting of chloroplatinic acid ($H_2PtCl_2$), palladium (ous) chloride ($PdCl_2$) and hydrochloric acid is first prepared. Other acidifying agents, such as nitric or sulfuric acid, can be used. The amount of acid added can be up to about 8 percent by weight of the total solution. Generally the amount of chloroplatinic acid and palladium chloride dissolved in the aqueous solution is the amount sufficient to provide a final calcined catalyst containing between about 0.2 and about 1.0 percent by weight each of elemental platinum and palladium metals.

Preferably the final calcined catalyst contains between about 0.3 and about 0.5 percent by weight of elemental platinum metal and between about 0.3 and about 0.9 percent by weight of elemental palladium metal. Preferably the mole ratio of elemental platinum metal to elemental palladium metal is between about 1 to 2 and about 1 to 6, and there is also present between about 1.2 and about 2.5 percent by weight of chlorine present as the chloride salt of either or both the platinum and the palladium present. As to the total weight of metal present on the catalyst, laboratory tests indicate that the economic advantages in catalyst activity diminish as the total elemental metals content in the catalyst exceeds 1.5 weight percent.

When the chloroplatinic acid and palladium (ous) chloride, have been dissolved and acid has been added, the porous catalyst support or carrier in the form of a powder, pellets, extrudate or spheres is added to the aqueous solution in a proper quantity so that the aqueous solution completely saturates the carrier. The saturated carrier can then be separated, drained and dried in preparation for calcining. It has been found that better control of the final concentration of platinum and palladium on the finished catalyst can be achieved by making up a volume of solution which will be in excess of that required to saturate a given mass of carrier. This volume should contain in total that amount of elemental platinum and palladium it is desired to deposit on the given mass of carrier. The carrier is then mixed with the total volume of solution and the mixture is heated to evaporate the water present while the carrier is continually agitated. This latter procedure is the preferred mode for saturating the porous carrier.

At the end of this absorption step the carrier, impregnated with platinum and palladium salts, is calcined at a temperature of 842° to about 1022° F or preferably about 914° to about 968° F. At temperatures in excess or below these ranges the activity of the catalyst is diminished. During calcination it is preferred to maintain an inert atmosphere, of preferably helium or other Group VIII inert gas or nitrogen over the catalyst. At the conclusion of the calcining operation the catalyst is ready for reduction treatment. Reduction is accomplished by heating the catalyst composition in the presence of hydrogen gas at a temperature of between about 500° F. and about 900° F. and a pressure of 0 to about 2000 psig.

A necessary and critical part in the preparation of the catalyst of our invention is the simultaneous impregnation of the carrier with both the platinum and the palladium salts in the same aqueous acidic solution. We have determined that a process in which either a platinum or palladium compound is first absorbed onto a carrier and the other subsequently absorbed does not yield a suitable catalyst for our purposes.

EXAMPLE I
PREPARATION OF CATALYST

An aqueous solution of chloroplatinic acid, palladium chloride, and hydrochloride was first prepared. Seventeen grams of chloroplantinic acid was dissolved in 198 grams of an aqueous solution containing 5 percent by weight of palladium (palladous) chloride. The resulting solution was then diluted with distilled water and acidified with hydrochloric acid to a volume of 810 ml. and a hydrogen chloride content of between 5 and 10 percent by weight. To this solution was added 900 ml. of a dry pure gamma alumina. After allowing the alumina sufficient time to absorb the solution, the excess solution ws decanted and the wet solution-impregnated alumina first was dried at 250° F. for approximately one hour and then was calcined under an atmosphere of inert gas at a temperature of approximately 925° F for 16 hours. Analysis of the finished catalyst by atomic absorption data indicated the concentration of elemental platinum metal on the catalyst was 0.48 percent and the concentration on elemental palladium metal was 0.70 percent, both by weight of the total catalyst.

HYDROGENATION OF FRACTIONS CONTAINING AROMATICS AND OLEFINS WITH SULFUR AND NITROGEN IMPURITIES

The feedstock which is hydrogenated by the catalyst of our invention is a hydrocarbon fraction boiling between about 180° F. and about 600° F. and commonly contains up to about 8 to 40% of aromatics and olefins. The feedstock ordinarily can contain up to 1000 ppm of sulfur and up to about 100 ppm of nitrogen. The hydrocarbon feedstock can be a liquid derived from petroleum refining, processing of oil shale and tar sands, or coal liquification.

Hydrogenation of the hydrocarbon feedstock is effected by contacting it in the presence of hydrogen gas with the catalyst prepared as described above. Just prior to using the calcined catalyst it is necessary to reduce the metals deposited thereon by contacting the catalyst with hydrogen gas preferably in the form of a refinery gas stream containing additional non reactive gases at a temperature of between 500° and 900° F. After this reduction step the catalyst is ready for use. Hydrogenation of the feedstock is carried out at temperatures between about 200° and about 700° F., a pressure of from about 100 to about 2000 psig, a liquid hourly space velocity of about 0.1 to about 10 volumes of liquid feedstock per volume of catalyst per hour, and at a ratio of hydrogen gas to feedstock of about 1000 to about 5000 standard cubic feet of hydrogen gas per barrel of feedstock. For purposes of measuring the liquid hourly space velocity and hydrogen gas feedstock ratios, the hourly volumes of liquid feedstock entering the process is metered at some point just prior to entering the zone of contact between feedstock, hydrogen gas, and catalyst.

EXAMPLE 2
HYDROGENATION OF HYDROCARBON FRACTION CONTAINING SULFUR AND NITROGEN

Approximately 5000 pounds of catalyst was prepared by the preferred method of this invention, that is, alumina pellets were saturated in a predetermined excess of aqueous solution of chloroplatinic acid, palladium chloride, and hydrochloric acid and was dried without decanting the excess solution. The impregnated alumina was then calcined at a temperature of approximately 925° F. in an inert atmosphere. Analyses of samples of the catalyst indicated contents ranging from 0.45 to 0.51 percent by weight of elemental platinum, 0.70 to 0.72 percent by weight of elemental palladium and from 2.10 to 2.30 percent by weight of chloride, all based on total weight of catalyst.

The catalyst was then positioned in a test column and reduced by flowing 70 to 80 thousand scf per hour of a refinery gas therethrough containing approximately 80 to 90 volume percent of hydrogen.

A hydrocarbon feedstock of varying composition was then flowed through the catalyst bed under conditions designed to promote hydrogenation of aromatics and olefins therein even in the presence of sulfur also contained therein. Results for a five-day run are shown in the following table.

TABLE I

| | | | | | |
|---|---|---|---|---|---|
| Cumulative hours on stream | 230 | 254 | 278 | 302 | 326 |
| Feed rate, barrels per day | 475 | 450 | 450 | 500 | 500 |
| Pressure, psig | 590 | 590 | 590 | 590 | 590 |
| Hydrogen injection rate, million cubic feet per day | 1.9 | 1.8 | 1.9 | 1.86 | 1.9 |
| Column inlet temperature, ° F. | 513 | 514 | 513 | 506 | 505 |
| Column outlet temperature, ° F. | 525 | 528 | 525 | 552 | 543 |
| Feedstock | | | | | |

TABLE I-continued

| | | | | | |
|---|---|---|---|---|---|
| Density, API | 51.9 | 52.0 | 51.4 | 51.7 | 51.1 |
| Ppm of sulfur | 108 | 139 | 106 | 177 | 134 |
| Percent aromatics content | 12.0 | 10.2 | 10.6 | 13.9 | 12.3 |
| Effluent product | | | | | |
| Density, API | 53.4 | 53.8 | 53.7 | 53.4 | 53.2 |
| Ppm of sulfur | 1.8 | 1.5 | 1.1 | 2.3 | 1.7 |
| Percent aromatics content | 3.4 | 2.5 | 2.5 | 6.0 | 5.2 |

From this data it is apparent that the catalyst functioned effectively over the five-day period as a hydrogenation catalyst even in the presence of sulfur.

EXAMPLE 3

COMPARISON OF PLATINUM-PALLADIUM CATALYST WITH OTHER METAL CATALYSTS

Catalyst combinations of platinum, palladium, rhenium, rhodium and ruthenium supported on alumina substrate were made up using the impregnation and calcining techniques described previously. This included the addition of hydrochloric acid to the aqueous solutions of metal salts, and the use of an inert gas atmosphere during calcination. After the catalyst samples had been made up and reduced they were tested for hydrogenation activity using a heavy naphtha feedstock containing 10.4 percent aromatics, 173 ppm sulfur, 1.8 ppm nitrogen, 3.3 ppm of choride, and having an API gravity of 50.3°. The hydrogenation tests, conducted at identical conditions for each run, were 525° F., 550 psig, an LHSV of 1.8, and a hydrogen gas input of 1,200 scf per barrel of feedstock. From the results tabulated below it is readily apparent that only the platinum-palladium catalyst retained the ability to function as a hydrogenation catalyst in the presence of sulfur over a period of time.

TABLE II

| | % AROMATICS IN PRODUCT | | | | |
|---|---|---|---|---|---|
| Test period, cumulative hours | 4 | 8 | 12 | 14 | 20 |
| Catalyst composition, percent by weight of total catalyst | | | | | |
| 0.3 Pt - 0.9 Pd | — | — | 1.4 | 1.4 | 1.4 |
| 0.3 Pt - 0.9 Ru | 7.8 | 10.4 | * | | |
| 0.3 Pt - 0.9 Rh | 0 | 0.3 | 8.9 | * | |
| 0.3 Rh - 0.9 Pd | 0 | 0 | — | 6.5 | * |
| 0.3 Ru - 0.9 Pd | 0 | 0.4 | 3.1 | 7.4 | * |
| 0.3 Ru - 0.9 Rh | 0 | 0.1 | 1.8 | 6.1 | * |
| 0.3 Rh - 0.9 Ru | 2.6 | 10.4 | * | | |

* test run abandoned

PLATINUM-to-PALLADIUM RATIO AND TOTAL METALS CONTENT

A series of platinum-palladium-alumina catalyst compositions were made up according to the method of this invention in which the total metal content was held approximately constant at about 1.2 percent by weight, but in which the ratio of the amount of platinum to palladium was varied. These compositions were then tested for hydrogenation catalytic activity, each test lasting for a period of 24 hours under identical conditions of temperature and pressure. The composition and physical properties of the hydrocarbon feedstock was the same as that in Example 3.

TABLE III

| Catalyst composition, weight percent of total catalyst | | | Weight percent of aromatics in effluent product after 24 hours |
|---|---|---|---|
| %Pt | %Pd | %Cl | |
| 1.21 | 0 | 1.72 | 8.8 |
| 0.20 | 1.03 | 1.88 | 3.6 |
| 0.39 | 0.83 | 1.90 | 3.4 |
| 0.59 | 0.63 | 1.75 | 5.2 |
| 0 | 1.21 | 1.90 | 8.9 * |
| 0.81 | 0.41 | 1.93 | 7.4 |
| 0.47 | 1.01 | 1.87 | 2.5 |
| 0.28 | 0.60 | 1.90 | 4.1  *after 12 hours |
| 0.28 | 0.89 | 1.70 | 3.2 |

From a graph of the preceeding data as shown in FIG. 1 it is readily apparent that an optimum ratio of weight of platinum to palladium occurs at around 0.3 percent by weight of elemental platinum and 0.9 percent elemental metallic palladium. It is further readily apparent that an optimum range of values for the weight ratio of platinum to palladium occurs between 0.6 to 0.6 and 0.15 to 1.05 or in terms of mole ratio of platinum to palladium of between about 1 to 2 and 1 to 12. The preferable range based on aging characteristics is between 1 to 2 and 1 to 6.

The catalyst properties can be restored by straight air regeneration at 900° followed by reduction at 700° F. A more effective and longer lasting catalyst is maintained if the catalyst is regenerated in air at around 900° F. and the catalyst is then cooled to a temperature of 700° F. by flowing air therethrough. Following this, the catalyst is reduced with hydrogen gas at 700° F.

We claim:
1. A hydrogenation catalyst consisting of between about 0.2 and about 1 percent by weight each of platinum and palladium in a mole ratio of platinum to palladium of between about 1 to 2 and about 1 to 6 supported on an inert carrier.

2. The catalyst of claim 1 wherein the weight of platinum is between about 0.3 and about 0.5 percent and the weight of palladium is between about 0.3 and about 1 percent.

3. The catalyst of claim 1 wherein the inert carrier is a gamma alumina.

4. A hydrogenation catalyst consisting of between about 0.2 and about 1.0 percent by weight each of platinum and palladium in a mole ratio of platinum to palladium of between about 1 to about 2 and about 1 to 6 and between about 1.2 to about 2.5 percent by weight of chlorine as chloride.

5. The catalyst of claim 4 wherein the weight of platinum is between about 0.3 and about 0.5 percent and the weight of palladium is between about 0.3 and about 1 percent.

6. The catalyst of claim 4 wherein the inert carrier is a gamma alumina.

* * * * *